(12) United States Patent
Yu et al.

(10) Patent No.: US 8,057,062 B2
(45) Date of Patent: Nov. 15, 2011

(54) PORTABLE ELECTRONIC DEVICE AND BATTERY WITH LIGHTING FUNCTIONALITY

(75) Inventors: Liang Yu, Taipei Hsien (TW); Chia-Ching Lee, Taipei Hsien (TW)

(73) Assignee: Wistron Corporation, Taipei Hsien (TW)

( * ) Notice: Subject to any disclaimer, the term of this patent is extended or adjusted under 35 U.S.C. 154(b) by 298 days.

(21) Appl. No.: 12/365,096

(22) Filed: Feb. 3, 2009

(65) Prior Publication Data
US 2009/0310341 A1 Dec. 17, 2009

(30) Foreign Application Priority Data
Jun. 12, 2008 (TW) .............................. 97121895 A

(51) Int. Cl.
*F21S 9/02* (2006.01)
(52) U.S. Cl. .......................................... 362/183; 362/85
(58) Field of Classification Search .................. 362/157, 362/183, 85, 194, 195; 320/114, 115
See application file for complete search history.

(56) References Cited

U.S. PATENT DOCUMENTS

| | | | |
|---|---|---|---|
| 6,491,406 B2 * | 12/2002 | Naghi ............................. | 362/85 |
| 6,874,907 B2 * | 4/2005 | Liao ............................... | 362/183 |
| 7,054,152 B2 | 5/2006 | Francke | |
| 7,347,581 B2 * | 3/2008 | Krieger ........................... | 362/183 |
| 7,393,117 B2 * | 7/2008 | Dalton et al. ................... | 362/157 |
| 7,589,500 B2 * | 9/2009 | Johnson et al. ................. | 320/134 |
| 7,638,970 B1 * | 12/2009 | Gebhard et al. ................ | 320/113 |
| 7,699,493 B2 * | 4/2010 | Canella .......................... | 362/200 |

FOREIGN PATENT DOCUMENTS

| | | |
|---|---|---|
| CN | 2692474 Y | 4/2005 |
| CN | 2854815 Y | 1/2007 |

OTHER PUBLICATIONS

Office Action dated Mar. 21, 2011, issued in corresponding Chinese Application No. 200810129035.X, with English translation provided by Taiwanese foreign associate, 17 pages.

* cited by examiner

*Primary Examiner* — Stephen F Husar
*Assistant Examiner* — Peggy A. Neils
(74) *Attorney, Agent, or Firm* — Christensen O'Connor Johnson Kindness PLLC

(57) ABSTRACT

A portable electronic device includes a housing and battery. The housing is formed with a battery-receiving compartment that has positive and negative electrodes. The battery is mounted in the battery-receiving compartment, and includes: a casing having positive and negative electrodes that are electrically and respectively connected to the positive and negative electrodes of the housing; a power storage unit having positive and negative electrodes that are electrically and respectively connected to the positive and negative electrodes of the casing; a switch having one end electrically coupled to one of the electrodes of the power storage unit; and a light-emitting element having two ends coupled respectively with another end of the switch and the other electrode of the power storage unit. The power storage unit is controllable through the switch for supplying power to the light-emitting element.

13 Claims, 2 Drawing Sheets

PORTABLE ELECTRONIC DEVICE AND BATTERY WITH LIGHTING FUNCTIONALITY

CROSS-REFERENCE TO RELATED APPLICATION

This application claims priority of Taiwanese application no. 097121895, filed on Jun. 12, 2008.

BACKGROUND OF THE INVENTION

1. Field of the Invention

This invention relates to a portable electronic device, more particularly to a portable electronic device having a battery provided with lighting functionality.

2. Description of the Related Art

During a power outage, it often proves difficult to find a flashlight or other emergency light source. Such inconvenience not only disrupts activities dependent on electric lighting, but also poses a safety concern, since poor visibility resulting from the power outage can lead to accidental injury. Clearly, a light source provided by an object frequently at hand, such as a notebook computer, would be more convenient and reduce risk of injury during the power outage.

SUMMARY OF THE INVENTION

Therefore, an object of the present invention is to provide a portable electronic device having a battery with lighting functionality.

According to the present invention, there is provided a portable electronic device comprising a housing and a battery.

The housing is formed with a battery-receiving compartment. The battery-receiving compartment has a wall face with a positive electrode and a negative electrode disposed thereon.

The battery is mounted removably in the battery-receiving compartment of the housing, and includes a casing, a power storage unit, a switch, and at least one light-emitting element.

The casing has a surface provided with positive and negative electrodes that extend into the casing. The positive electrode of the casing is electrically connected to the positive electrode of the housing, and the negative electrode of the casing is electrically connected to the negative electrode of the housing.

The power storage unit is contained in the casing, and is provided with a positive electrode electrically connected to the positive electrode of the casing, and a negative electrode electrically connected to the negative electrode of the casing.

The switch is mounted on the casing such that a portion thereof is exposed outwardly of the casing. The switch is provided with two ends. One of the ends is electrically coupled to one of the positive and negative electrodes of the power storage unit.

The at least one light-emitting element is mounted on the casing such that a portion thereof is exposed outwardly of the casing. The light-emitting element is provided with two ends coupled respectively with another one of the ends of the switch and another one of the positive and negative electrodes of the power storage unit. The power storage unit is controlled through the switch for supplying power to the light-emitting element so as to cause the light-emitting element to emit light. Preferably, the battery further includes a light-transmissable cap mounted on the casing for covering the portion of the light-emitting element that is exposed outwardly of the casing.

In an embodiment of the invention, the portable electronic device is a notebook computer, and the battery further includes a current-limiting component for limiting flow of electrical current to the light-emitting element. The current-limiting component, the switch, and the light-emitting element are connected in series so as to enable the light-emitting element and the power storage unit to form a forward biased connection.

In an embodiment of the invention, the housing further includes at least one engaging groove disposed in the wall face of the battery-receiving compartment having the positive and negative electrodes of the housing. The casing of the battery is further provided with at least one engaging hook corresponding in number and position to the at least one engaging groove. Engagement between the at least one engaging hook and the at least one engaging groove secures the battery in the housing. Preferably, the housing further includes a release button that is operable so as to disengage the at least one engaging hook of the battery from the at least one engaging groove in the housing.

Since the battery of the portable electronic device of the present invention is provided with the switch and the light-emitting element, and since the battery is capable of supplying power to the light-emitting element so as to cause the light-emitting element to emit light, the battery of the portable electronic device provides lighting functionality.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
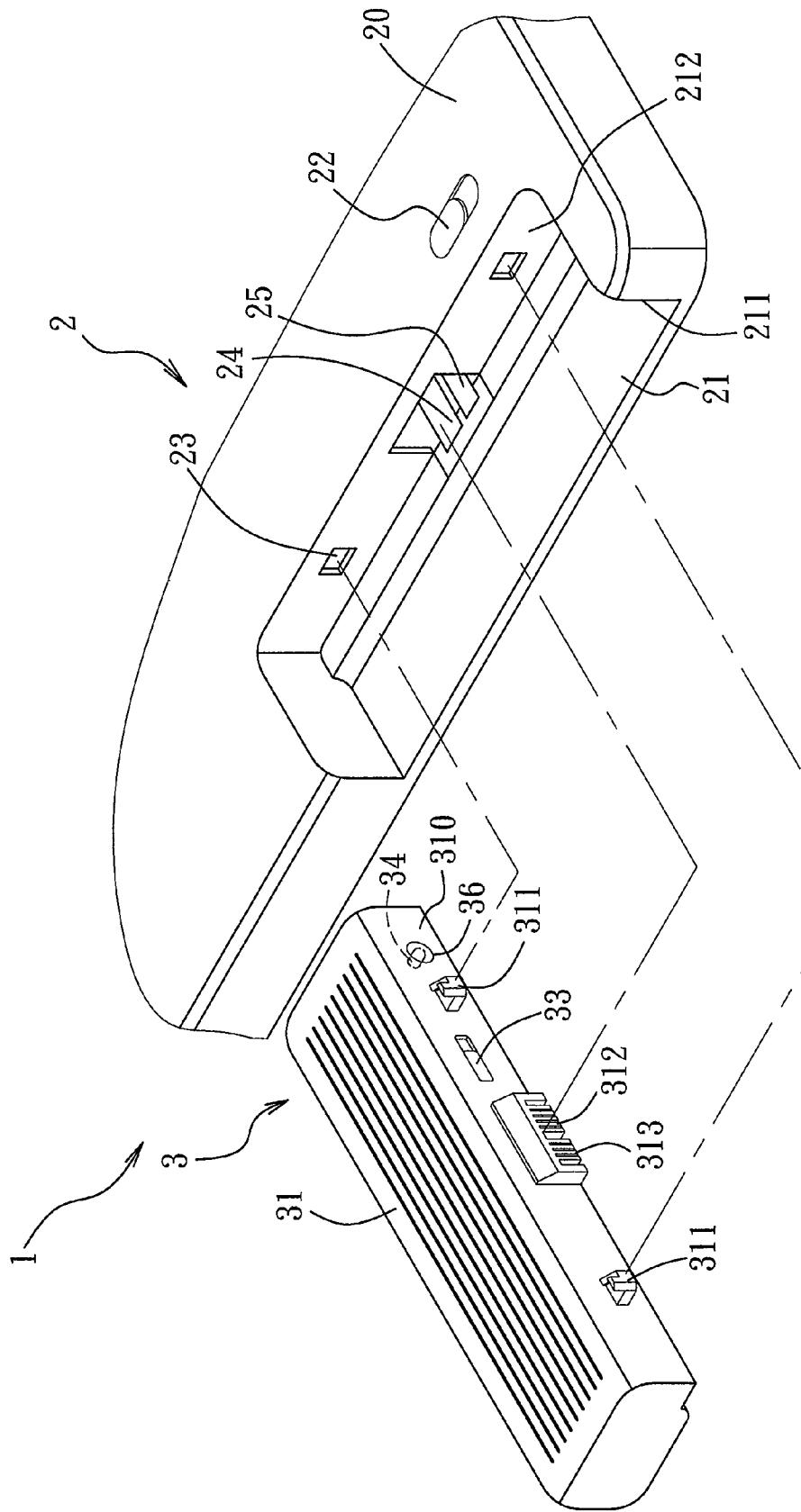
FIG. 1 illustrates an exploded perspective view of a preferred embodiment of a portable electronic device according to the present invention.

FIG. 1 illustrates a preferred embodiment of a portable electronic device 1 according to the present invention. In this embodiment, the portable electronic device 1 is a notebook computer comprising a housing 2 and a battery 3. The housing 2 has a top side (not shown) provided with a keyboard, a bottom side 20 that is spaced apart from the top side, and a surrounding side surrounding outer edges of the top side and the bottom side 20. The bottom side 20 of the housing 2 is formed with a battery-receiving compartment 21 that is provided with an opening 211 in the surrounding side of the housing 2. The battery-receiving compartment 21 has a wall face 212 that is opposite to the opening 211, that has positive and negative electrodes 24, 25 disposed thereon, and that preferably includes at least one engaging groove 23 disposed therein. In this embodiment, two engaging grooves 23 are disposed in the wall face 212, and the positive and negative electrodes 24, 25 are disposed on the wall face 212 between the two engaging grooves 23.

The battery 3 includes a casing 31 that has a size and shape configured to conform to the battery-receiving compartment 21. A side surface 310 of the casing 31 is disposed to confront the wall face 212 of the battery-receiving compartment 21 and is provided with positive and negative electrodes 312, 313 that extend into the casing 31 and that correspond in position to the positive and negative electrodes 24, 25 of the housing 2.

The side surface 310 is preferably provided with at least one engaging hook 311 corresponding in number and position to the at least one engaging groove 23 in the wall face 212 of the battery-receiving compartment 21. Accordingly, in this embodiment, the side surface 310 of the battery 3 is provided with two engaging hooks 311.

When the battery 3 is mounted in the battery-receiving compartment 21 through the opening 211 in the housing 2 of the portable electronic device 1, engagement between the engaging hooks 311 of the battery 3 and the engaging grooves 23 in the battery-receiving compartment 21 secures the battery 3 in the battery-receiving compartment 21 of the housing 2, and the positive and negative electrodes 312, 313 of the casing 31 are connected electrically and respectively to the positive and negative electrodes 24, 25 of the housing 2, thereby enabling the battery 3 to supply power to the portable electronic device 1.

In this embodiment, the housing 2 of the portable electronic device 1 further includes a release button 22 disposed on the bottom side 20 and operable so as to drive the engaging hooks 311 of the battery 3 to disengage from the engaging grooves 23 in the housing 2, thereby permitting removal of the battery 3 from the battery-receiving compartment 21 of the housing 2. Of course, the quantity of the engaging hooks 311 and engaging grooves 23 is not limited to what is described herein, and the manner in which the battery 3 is secured in the battery-receiving compartment 21 is not limited to the engagement between the engaging hooks 311 and the engaging grooves 23.

Figure 2:
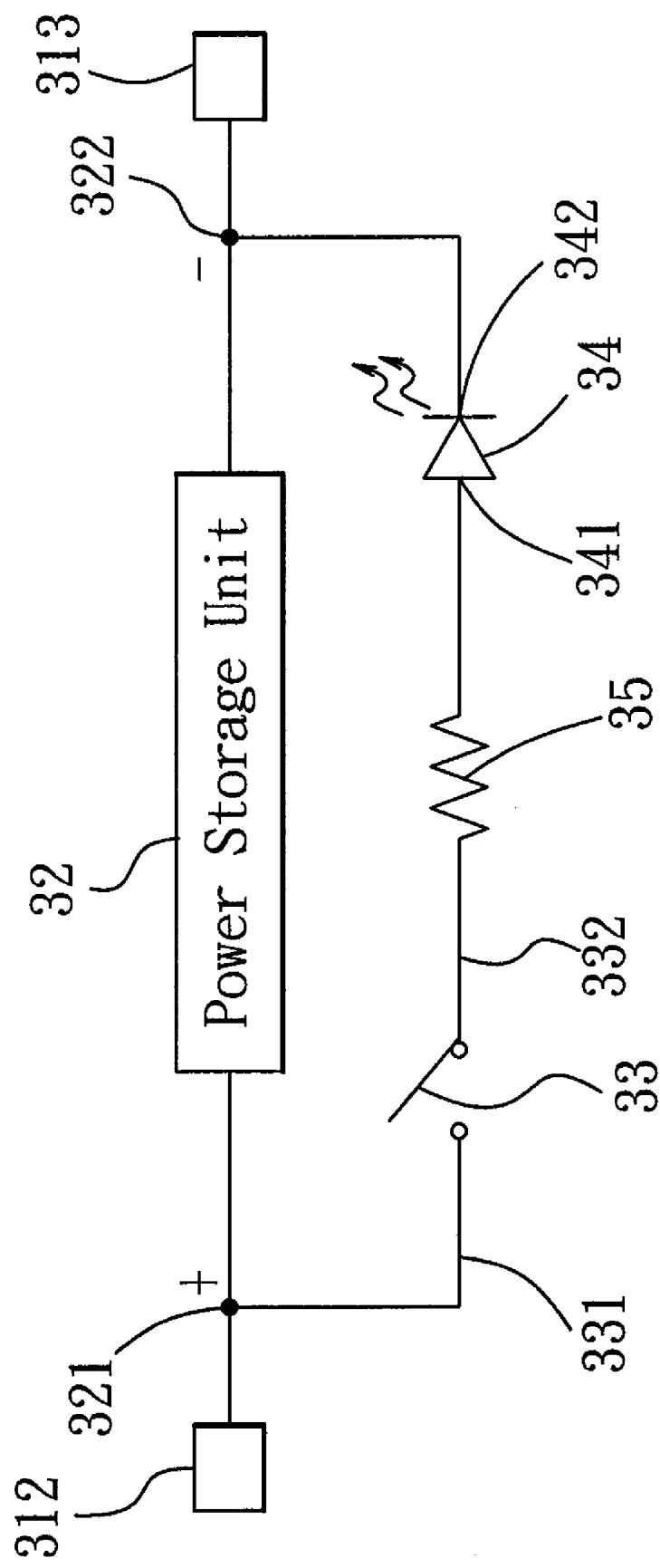
FIG. 2 is a schematic circuit block diagram to illustrate a circuit inside a battery of the preferred embodiment.

With additional reference to FIG. 2, the battery 3 of the preferred embodiment of the portable electronic device 1 is shown to further include a power storage unit 32, a switch 33, a light-emitting element 34, and a current-limiting component 35.

The power storage unit 32 is contained in the casing 31 of the battery 3, and is provided with a positive electrode 321 electrically connected to the positive electrode 312 of the casing 31, and a negative electrode 322 electrically connected to the negative electrode 313 of the casing 31. In this embodiment, the power storage unit 32 comprises six series/parallel connected storage cells.

The switch 33 is mounted on the side surface 310 of the casing 31 such that a portion thereof is exposed outwardly of the casing 31, and is provided with two ends 331, 332. One of the ends 331, 332 is electrically coupled to one of the positive and negative electrodes 321, 322 of the power storage unit 32. In this embodiment, one of the ends 331 is electrically coupled to the positive electrode 321 of the power storage unit 32.

The light-emitting element 34 is mounted on the side surface 310 of the casing 31 such that a portion thereof is exposed outwardly of the casing 31. The light-emitting element 34 is provided with two ends 341, 342 coupled respectively with another one of the ends 331, 332 of the switch 33 and another one of the positive and negative electrodes 321, 322 of the power storage unit 32. The power storage unit 32 is controlled through the switch 33 for supplying power to the light-emitting element 34 so as to cause the light-emitting element 34 to emit light.

In this embodiment, the light-emitting element 34 is a light-emitting diode (LED). One of the ends 342 (N terminal) of the light-emitting element 34 is electrically coupled with the negative electrode 322 of the power storage unit 32. Since the portable electronic device 1 has a greater need for power than the light-emitting element 34, the current-limiting component 35, which in this embodiment is a resistor, is connected in series to the other end 332 of the switch 33 and the other end 341 (P terminal) of the light-emitting element 34, so as to limit current flow from the power storage unit 32 to the light-emitting element 34 when the switch 33 is closed. Of course, the quantity of the light-emitting element 34 can be increased according to needs, and is not limited to what is disclosed herein.

The switch 33, the light-emitting element 34 and the current-limiting element 35 are connected in series so as to enable a forward biased connection between the power storage unit 32 and the light-emitting element 34. Apart from the aforesaid requirement, the manner in which the switch 33, the light-emitting element 34 and the current-limiting element 35 are connected is not limited to what is described herein.

In this embodiment, the battery 3 further includes a light-transmissible cap 36 mounted on the side surface 310 of the casing 31 for covering the portion of the light-emitting element 34 that is exposed outwardly of the casing 31. Aside from protecting the light-emitting element 34, the light-transmissible cap 36 prevents entry of dust and debris, and consequent dimming of the light emitted from the light-emitting element 34.

Moreover, since the light-emitting element 34 and the switch 33 are mounted on the side surface 310 having the engaging hooks 311 for engaging the engaging grooves 23 of the wall face 212 of the battery-receiving compartment 21, and the positive and negative electrodes 312, 313 for connecting electrically and respectively to the positive and negative electrodes 24, 25 of the wall face 212 of the battery-receiving compartment 21, when the battery 3 is mounted in the battery-receiving compartment 21 of the portable electronic device 1, the light-emitting element 34 and the switch 33 are hidden. The conventional appearance of the portable electronic device 1 is thus maintained.

In sum, the battery 3 of the portable electronic device 1 of the present invention includes a switch 33 and a light-emitting element 34. The switch 33 is operable so as to control the battery 3 to supply power to the light-emitting element 34 for causing the light-emitting element 34 to emit light. The battery 3 can therefore provide a convenient source of lighting during a power outage. Moreover, since the battery 3 of the present invention can be used to supply power to the light-emitting element 34 as well as to the portable electronic device 1, the aforesaid source of lighting is obtainable without requiring additional batteries, thus protecting the environment.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A portable electronic device, the portable electronic device being a notebook computer and comprising:
   a housing formed with a battery-receiving compartment, said battery-receiving compartment having a wall face with a positive electrode and a negative electrode disposed thereon; and
   a battery mounted removably in said battery-receiving compartment of said housing, and including
   a casing having a surface provided with positive and negative electrodes that extend into said casing, said positive electrode of said casing being electrically connected to said positive electrode of said housing, said negative electrode of said casing being electrically connected to said negative electrode of said housing, a power storage unit contained in said casing, and provided with a positive electrode electrically connected to said positive electrode of said casing, and a negative electrode electrically connected to said negative electrode of said casing, a switch mounted on said casing, said switch being provided with two ends, one of said ends being electrically coupled to one of said positive and negative electrodes of said power storage unit, and at least one light-emitting element exposed outwardly of said casing, said light-emitting element being provided with two ends coupled respectively with another one of said ends of said switch and another one of said positive and negative electrodes of said power storage unit, said power storage unit being controlled through said switch for supplying power to said light-emitting element so as to cause said light-emitting element to emit light.

2. The portable electronic device as claimed in claim 1, wherein said battery further includes a current-limiting component for limiting flow of electrical current to said light-emitting element, said current-limiting component, said switch, and said light-emitting element being connected in series so as to enable said light-emitting element and said power storage unit to form a forward biased connection.

3. The portable electronic device as claimed in claim 2, wherein said housing further includes at least one engaging groove disposed in said wall face of said battery-receiving compartment having said positive and negative electrodes of said housing, and said casing of said battery is further provided with at least one engaging hook corresponding in number and position to said at least one engaging groove, engagement between said at least one engaging hook and said at least one engaging groove securing said battery in said housing.

4. The portable electronic device as claimed in claim 1, wherein said light-emitting element is a light-emitting diode.

5. The portable electronic device as claimed in claim 2, wherein said light-emitting element is a light-emitting diode.

6. The portable electronic device as claimed in claim 3, wherein said light-emitting element is a light-emitting diode.

7. The portable electronic device as claimed in claim 6, wherein said battery further includes a light-transmissible cap mounted on said casing for covering said portion of said light-emitting element that is exposed outwardly of said casing.

8. The portable electronic device as claimed in claim 7, wherein said housing further includes a release button that is operable so as to disengage said at least one engaging hook of said battery from said at least one engaging groove in said housing.

9. A battery with lighting functionality, said battery being adapted for powering a notebook computer, said battery comprising:

a casing adapted to be received in a battery-receiving compartment of the notebook computer, and having a surface provided with positive and negative electrodes that extend into said casing, said positive electrode of said casing being adapted to electrically connect to the positive electrode of a housing, said negative electrode of said casing being adapted to electrically connect to the negative electrode of the housing;

a power storage unit contained in said casing, and provided with a positive electrode and a negative electrode;

a switch mounted on said casing, said switch being provided with two ends, one of said ends being electrically coupled to one of said positive and negative electrodes of said power storage unit; and at least one light-emitting element exposed outwardly of said casing, said light-emitting element being provided with two ends coupled respectively with another one of said ends of said switch and another one of said positive and negative electrodes of said power storage unit, said power storage unit being controlled through said switch for supplying power to said light-emitting element so as to cause said light-emitting element to emit light.

10. The battery with lighting functionality as claimed in claim 9, further comprising a current-limiting component for limiting flow of electrical current to said light-emitting element, said current-limiting component, said switch, and said light-emitting element being connected in series so as to enable said light-emitting element and said power storage unit to form a forward biased connection.

11. The battery with lighting functionality as claimed in claim 9, wherein said light-emitting element is a light-emitting diode.

12. The battery with lighting functionality as claimed in claim 10, wherein said light-emitting element is a light-emitting diode.

13. The battery with lighting functionality as claimed in claim 12, further comprising a light-transmissible cap mounted on said casing for covering said portion of said light-emitting element that is exposed outwardly of said casing.

* * * * *